United States Patent [19]
Briggs et al.

[11] 3,863,201
[45] Jan. 28, 1975

[54] SEISMOMETER ARRAYS USING OPERATIONAL AMPLIFIERS

[75] Inventors: Russell M. Briggs; Hesin ab Iorwerth, both of Calgary, Alberta, Canada

[73] Assignee: Amoco Production Company, Tulsa, Okla.

[22] Filed: May 29, 1973

[21] Appl. No.: 364,767

[52] U.S. Cl. .... 340/15.5 GC, 340/15.5 F, 324/77 B
[51] Int. Cl. .......................... G01v 1/36, G01v 1/16
[58] Field of Search. 340/15.5 GC, 15.5 F, 15.5 CF, 340/7 R; 324/77 B; 181/.5 NP

[56] References Cited
UNITED STATES PATENTS

| | | | |
|---|---|---|---|
| 2,431,600 | 11/1947 | Wolf | 340/15.5 R |
| 3,096,846 | 7/1963 | Savit et al | 340/15.5 F |
| 3,349,866 | 10/1967 | Mifsud | 340/15.5 GC |

OTHER PUBLICATIONS

Holzman, "Chebyshev Optimized Geophone Arrays," 4/63, pg. 145–155, Geophysics, Vol. 28, No. 2.

*Primary Examiner*—Maynard R. Wilbur
*Assistant Examiner*—N. Moskowitz
*Attorney, Agent, or Firm*—Paul F. Hawley; John B. Farr

[57] ABSTRACT

A seismometer weighting apparatus is described which uses solid-state operational amplifiers for conveniently applying weighting coefficients to individual seismometer signals which are then combined to form noise-rejecting arrays. This apparatus produces improved noise attenuation while retaining use of uniform field seismometers and equal spacing of these seismometers to expedite operations.

12 Claims, 5 Drawing Figures

Patented Jan. 28, 1975

TO ADDITIONAL OPERATIONAL
AMPLIFIERS AS REQUIRED.

FROM ADDITIONAL
OPERATIONAL AMPLIFIERS.

3,863,201

SEISMOMETER ARRAYS USING OPERATIONAL AMPLIFIERS

BACKGROUND OF THE INVENTION

1. Field of the Invention

This invention relates to seismic prospecting where arrays of seismometers placed at or near the surface of the ground are used as spatial filters to attenuate noise waves. Customarily, a plurality of equally spaced seismometers, each having approximately uniform sensitivity are electrically connected together to form a group array. Twenty-four to 48 such group arrays are connected by multiconductor cables to a remote multichannel amplifying and recording apparatus where the electrical signals from each group are separately amplified and recorded on individual channels. The individual seismometers in each group are presently connected in series, parallel or series-parallel to produce a single electrical signal prior to transmission to the remote amplifying and recording apparatus.

As is well known in spatial filtering art, such uniformly spaced arrays of equally sensitive seismometers are directionally responsive to arriving signal and noise waves in different ways. Reflection signals, having first traveled downward into the earth from source points at or near the surface, are reflected from subterranean geological interfaces and then travel upward, striking the array at almost vertical incidence. On the other hand, noise signals arrive at the array seismometers at other than vertical incidence, having been propagated from the source in the near surface region.

The ability of a uniform seismometer array to maximize the amplitude ratio of the reflection-signal energy to noise-signal energy is dependent on its areal extent and the number of individual elements it contains. Using equally spaced, uniform-sensitivity seismometers, it has been assumed that the reflection signal-to-random-noise ratio produced by a given array will vary as the square root of the number of seismometers used. Under this assumption continuous improvement in reflection quality would be expected as the number of seismometers increased indefinitely. Field results have shown that such is not the case, but that a saturation point exists where further improvement in reflection quality cannot be obtained despite an increase in the number of seismometer elements used in each array. In some areas, no matter how many seismometers are used, it is not possible to obtain intelligible reflection signals.

One method of further improving the signal-to-noise ratio that can be achieved with a given sized array is to weight the individual array elements nonuniformly. This practice is well known in the prior art under such names as "tapering," "shading," "shaping," and the like. In comparing uniform and weighted arrays it is common practice to describe each array by its spatial frequency response curve, which is a plot of amplitude, relative response, or attenuation on the vertical axis, and the unitless quantity $d/\lambda$ or wavenumber $(1/\lambda)$ on the horizontal axis, where $d$ is the distance between array elements and $\lambda$ is the apparent wavelength of an arriving signal or noise wave. The spatial filtering effect of an array is described by such an amplitude wavenumber response curve in a manner analogous to the amplitude-frequency response curve used to describe electrical filtering networks. The inverse of the apparent wavelength of a signal moving across the array is defined as the wavenumber of that signal. By multiplying the wavenumber by the distance between elements, a normalized graph can be prepared showing the filtering effects of the number of elements and the weighting of each element, independent of element spacing "$d$."

In seismic applications, noise will generally have a larger wavenumber than the simultaneously arriving reflection signals. The ideal spatial filter response for a seismometer array would therefore have a pass-band where all reflection signals having a wavenumber less than some predetermined infinitely sharp cut-off point would be passed without attenuation, while all noise signals with wavenumbers above this point would be completely rejected. Such an ideal response is obtainable with any finite array containing a practical number of seismometers; however, the closer any field array response can approach this ideal response the better will be its ability to enhance the reflection signal-to-noise ratio.

Increasing the number of elements and thereby reducing the interelement spacing within a given array area is the method currently employed by the seismic prospecting industry to improve the spatial filter response curve. Other methods, including variable seismometer weighting and/or spacing, have been suggested but not adopted in routine seismic operations. These prior art techniques all require a fixed array design be adopted at the inception of a seismic survey and commonly, due to logistical and equipment limitations, the same array is maintained throughout the entire survey area. Seismic noise which can be extremely variable from point to point in a given survey area is not adequately attenuated by such fixed arrays with small numbers of elements. In many cases this has resulted in an "over-kill" approach where an excessively large number of seismometers has been employed in each array to make sure an adequate array response is obtained regardless of changing field noise waves. As many as 144 seismometers have been used in each group array to produce usable data in some areas. When 36 or 48 groups are recorded simultaneously, 5,000 to 7,000 seismometers are required, which imposes a severe financial as well as logistical hardship on the operating seismic crew.

In an increasing number of difficult exploration areas, the signal-to-noise improvement anticipated with a simple increase in the number of seismometers per array has failed to materialize. To meet the requirements of present-day exploration objectives, the seismic method must be ablve to delineate more subtle subsurface structures in complicated geological environments at greater depths and in more detail than is currently possible. To accomplish these objectives requires additional signal-to-noise improvement which can only result from the application of weighted seismometer arrays in routine seismic field operations.

2. Description of the Prior Art

A good general review of seismometer arrays is given by Parr and Mayne, Geophysics, Vol. 20, p. 539–564, 1955. As shown in this article, uniformly spaced array elements with equal sensitivity produce an amplitude wavenumber response curve with a gently sloping cut-off and a number of residual maxima in the reject region. Increasing the number of array elements will increase the cut-off slope and rejection bandwidth while simultaneously reducing the amplitude of the residual maxima remaining in the reject band. However, as the number of uniform array elements increases to a large number, the reject band response becomes essentially independent of the number of elements used.

As discussed in the above article and taught by Parr in U.S. Pat. No. 2,968,927, an improved array response can be obtained by progressively reducing the sensitivities of the seismometers outward from the center of the array. Parr uses the Chebyshev polynomials as a basis for determining the respective seismometer weights. Bayhi, U.S. Pat. No. 2,747,172, likewise reduces the sensitivity of the outer array seismometers to obtain an improved amplitude wavenumber response curve, but uses simple arithmetical weighting. Savit, et al., U.S. Pat. No. 3,096,846, uses a moveout criterion to determine the optimum seismometer weights to be applied in array tapering. In addition to the above, the classical weighting of array elements according to the binomial coefficients can be used. An excellent theoretical discussion of weighting techniques is given by Holzman in Geophysics, Vol. 28, p. 145–155, 1963.

Despite the improved results that can be obtained by their use, nonuniformly weighted arrays have not been readily adopted by the seismic prospecting industry. The main reason for this has been due to the operational complexity and therefore the increased cost engendered by their use. It has heretofore been found more expedient to use arrays of uniform sensitivity seismometers rather than handle the additional seismometers, as taught by Bayhi, U.S. Pat. No. 2,474,172, or use the variety of different sensitivity seismometers as taught by Parr, U.S. Pat. No. 2,968,927, and Savit, et al., U.S. Pat. No. 3,096,846. The increased cost and logistical problems associated with the use of additional seismometers to weight the output of a particular array element is apparent. For a simple 16-element array, as shown by Bayhi, 56 additional seismometers are required to achieve the desired weighting. For the same 16-element array, eight different sensitivity seismometers would be required using the Parr or the Savit, et al., technique. Each of these different seismometers have to be distinctly marked and placed at precisely the right spot in the field array. In routine operations, it is difficult to mark each seismometer position, and without such markings great confusion results when different seismometers are used at different array points. In addition to the increased complexity involved in using different sensitivity seismometers, a large number of spare seismometers are required, since any one of the different models might fail at any given time.

As taught by Bayhi, Parr, and Savit, et al., individual seismometer sensitivity may be changed by the use of external resistor networks placed between the uniform seismometers and the multiconductor cable connection. Such networks dissipate power, reducing the overall array sensitivity to achieve an improved response curve. Any of the array-weighting procedures described in the prior art require substantially lower output from seismometers at the edge of the array than from those in the center. For example, using Bayhi's arithmetic weighting, a 16-element array would have only 56 percent of the total output of an equivalent 16-element uniform array. The outer element of this same array would have only 13 percent of the output of the equivalent uniform sensitivity seismometer. Savit, et al., using moveout weighting, call for an outer seismometer having only 11 percent of the sensitivity of the center seismometer in a 21-element array. The average weighted array sensitivity combining all of the normal moveout weighted elements given by Savit, et al., is only 62 percent of that for an equivalent uniform array.

To offset the difficulties encountered in the use of nonuniformly weighted seismometer elements, other types of arrays have been proposed which retain uniform seismometers but alter the spacing of the seismometers in the array. For example, see Clay, U.S. Pat. No. 2,906,363, and Lee and Kerns, U.S. Pat. No. 3,400,783. Nonuniformly spaced arrays have improved amplitude wavenumber response curves while retaining full array sensitivity, but also have not been adopted by the industry, due to the very much increased surveying and seismometer layout effort required. As with the nonuniformly weighted arrays, the improved results did not warrant the increased cost of field operations and it was found preferable to use larger uniform arrays with increased number of identically spaced seismometers.

Most of the array designs taught in the prior art are optimized for reflection signals arriving vertically from subterranean reflecting horizons. In certain mountainous areas reflection signals may arrive at the receiving array from off-vertical directions. In such cases it becomes desirable to steer the direction of the array's maximum sensitivity such that the improved signal-to-noise ratios are produced by the array in arbitrary directions. Such beam-steering requires changes be made in the seismometer weighting in the field in accordance with the position of the line array relative to the position of mountain fronts and other geological phenomena. As taught by Wolf, U.S. Pat. No. 2,431,600, Foldy, U.S. Pat. No. 2,396,222, and others, alternating seismometer polarities can be useful in weighted arrays when directional sensitivity is required. By using alternate seismometer polarity in conjunction with weighting, it is possible to attenuate long apparent wavelength noise waves, while passing the shorter apparent wavelength signals arriving from off-vertical directions. Reverse polarity seismometers present the same field difficulties as the individual seismometers with different sensitivities. They must be clearly marked and placed only at specific points within the array. If inadvertently placed at the wrong spot on the ground, such reverse polarity seismometers can severely degrade the received signal.

SUMMARY OF THE INVENTION

Our invention is a small operational amplifier weighting unit which, when inserted between the individual leads from an array of uniform sensitivity seismometers and the conventional seismic cable connector, permits on-site element weighting adjustments, thereby optimizing the array response. The weighting unit utilizes several monolithic operational amplifiers, which by means of adjustable gain-control circuits, increase the sensitivity of the central array elements relative to the outer elements.

The operational amplifiers used in our invention produce an improved array response without the loss of array sensitivity incurred when resistor pads are used and without the increase in field operational problems created by the use of different sensitivity seismometers or the use of additional seismometers, or changing the spacing of identical seismometers as taught in the prior art.

The weighting unit provides the known benefits of seismometer array weighting with no change in existing seismometers, seismic field cables, or operational procedured in current use.

BRIEF DESCRIPTION OF THE DRAWINGS

FIGS. 2a and 2b compare the seismometer array responses obtained using a uniformly weighted, equally spaced, 18-element array according to current practice and two types of integer weighting applied to this same array using our improved weighting unit.

DETAILED DESCRIPTION OF THE PREFERRED EMBODIMENT

Our invention is an arrangement of integrated circuit operational amplifiers connected between the individual seismometers in a group array and the single group connector on the multiconductor cable used to transmit the group array signal to a remote amplifying and recording apparatus. Presently, the individual seismometers are electrically interconnected such that each seismometer element in the array contributes equally to the output signal. By using operational amplifiers, certain selected seismometer signals can be amplified relative to other seismometer signals and then combined, thereby producing an output group array signal with an improved directional response.

The very small size and lower power requirements of modern operational amplifiers permit mounting of a number of weighting amplifiers, their associated batteries, and gain controls in a single rugged case which can be readily hand-carried in the field. The amplifiers can be easily adjusted to provide the optimum signal-to-noise ratio regardless of the varying noise conditions encountered in day-to-day operations as the seismic field crew moves across the countryside. By combining the amplification or weighting and polarity-reversal functions our weighting unit achieves an improved array response, using identical seismometers in the field layout, thereby retaining the existing simplicity and efficiency of current operations.

Due to the amplification provided by the tiny solid-state devices, the overall seismometer array sensitivity can be kept at a high level despite the 85 to 90 percent reduction in outer array element sensitivities required in most weighting techniques. In contrast to this amplification, the prior art resistor networks used for array weighting, dissipated a large portion of the overall power generated by the array seismometers.

By using the inverting and noninverting inputs of the operational amplifiers, polarity reversals are handled entirely by the internal circuitry. Since the signals from each of the individual seismometers are to be summed after proper weighting, the number of different amplifiers required is reduced substantially when simple weighting ratios can be utilized. In a similar manner, when symmetrical arrays are used, as in the case in a large percentage of geophysical work, single amplifiers and their associated feedback gain-control circuits can be utilized for two or more array elements. By using an operational amplifier averaging circuit, the array output remains at a nearly constant level regardless of the weights, polarities, or number of seismometers used in each array. This permits a simple adjustment of the field array without requiring changes in the remote recording and amplifying apparatus.

Figure 1:
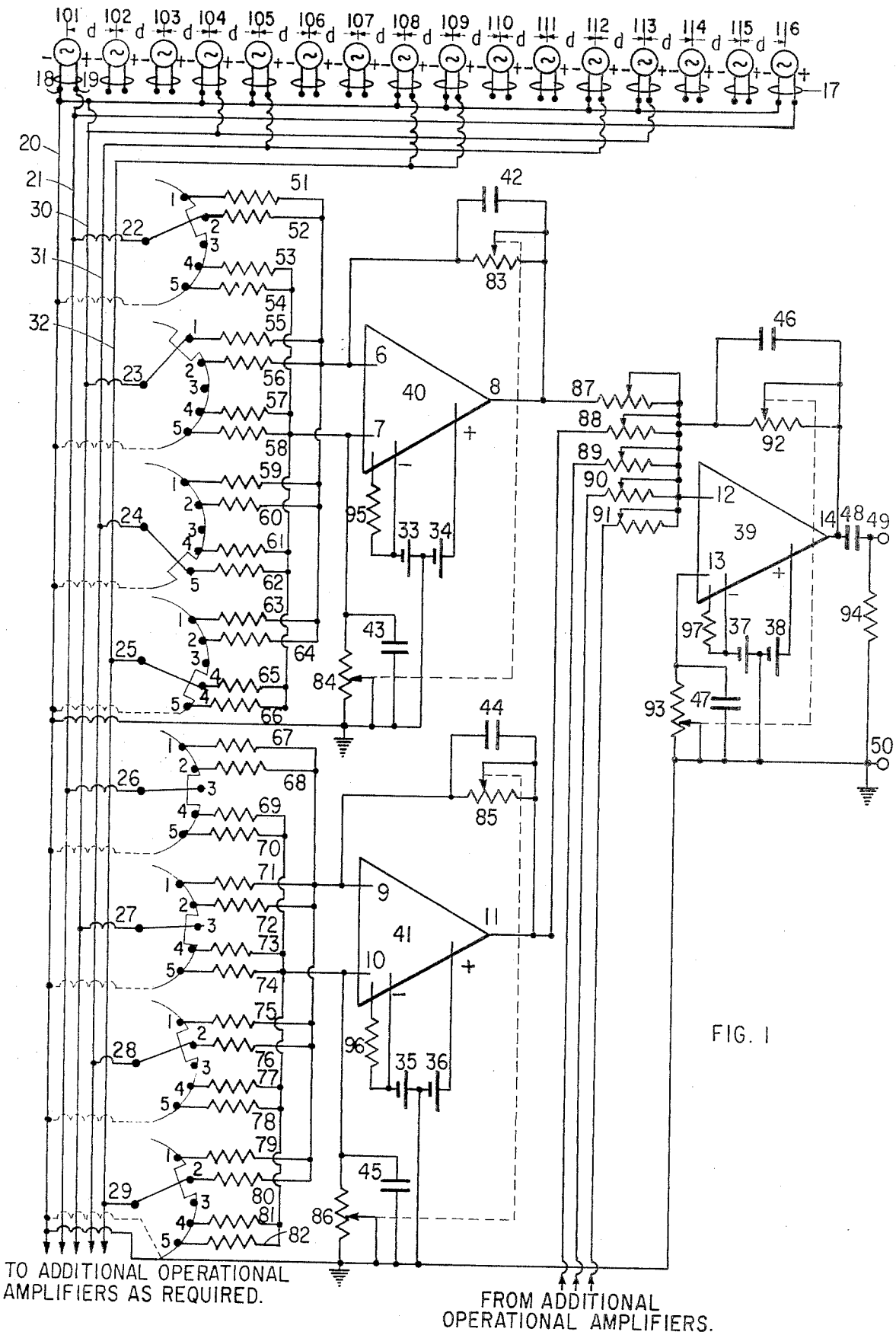
FIG. 1 is a simplified schematic diagram of the monolithic operational amplifier weighting and averaging circuit used in the preferred embodiment of our invention.

Attention is directed to FIG. 1 which is a schematic diagram of the preferred embodiment of our invention. The basic seismometer array element, or geophone 101, is a velocity-sensitive seismic wave transducer. Such units frequently use a permanent magnet for producing a strong magnetic field within which is positioned an electrical winding supported by a spring coil support from the case. Motion between the magnet and the coil produces an electrical signal proportional to the velocity of ground motion at the position of seismometer 101. Located a distance "$d$" from seismometer 101 is a second identical seismometer, 102, which likewise produces an electrical signal in response to the ground motion at position 102. Additional seismometers are positioned at equally spaced intervals $d$ along the ground surface to form the seismometer group array. To illustrate our weighting unit, a linear array of 16 identical seismometer elements, 101, 102, 103, 104, 105, 106, 107, 108, 109, 110, 111, 112, 113, 114, 115, and 116, is shown in FIG. 1. Although a linear array is used for illustrative purposes, it should be understood that out weighting unit is also designed for use with areal arrays which are to be preferred where operational and particularly terrain considerations permit their use.

In the majority of geophysical surveys, the subterranean reflecting interfaces are nearly flat and consequently the reflection signals impinge on the array at vertical or near-vertical incidence. Seismic signal source points are usually located off both ends of the array and, at the later stages in seismic data processing, traces recorded from different arrays and source positions are combined to enhance the reflection signal. For these reasons, it has been found desirable to employ symmetrically weighted arrays in the majority of geophysical surveys. Such symmetrical weighting permits the combination of electrical signals from seismometers positioned symmetrically around the center of the array prior to applying the weights. As seen in FIG. 1, the signal from seismometer 101 is combined with the signal from seismometer 116. In a similar manner, signals from seismometer pairs 102 and 115, 103 and 114, 104 and 113, 105 and 112, 106 and 111, 107 and 110, and 108 and 109 would likewise be combined. (For simplicity, some such connections are omitted from FIG. 1.) Each such pair of seismometers is then connected to an individual input signal bus. The negative leads from all seismometers are connected to bus 20, while for example the positive leads from seismometer pairs 101 and 116, 104 and 113, 105 and 112, and 108 and 109 are shown feeding buses 21, 30, 31, and 32 in FIG. 1, respectively. However, it should be understood that the remaining pairs of seismometers each feed their respective buses which are not shown. All buses, including those not shown, are connected independently by switches to all operational amplifiers. By symmetrically combining the signals prior to weighting, the number of switches per amplifier required for a given number of inputs is halved.

When surveys are conducted in geological areas where steeply dipping, reflecting interfaces are present, signals will arrive at the seismometer array from off-vertical directions and the symmetrical arrays can no longer be employed to optimize the signal-to-noise ratio. When such nonsymmetrical weighting is desired, the combination of seismometer elements 101 and 116, etc., as shown in FIG. 1, must be eliminated and a unit with separate input buses used. Alternatively, a combined input unit but with only the first half of the inputs connected can be used if the number of array elements is halved. In most steep dip areas, smaller arrays are considered more advantageous for geometrical as well as operational reasons and our units can be directly employed with half the number of input channels unused.

A single combined signal from seismometer elements 101 and 116 is first directed down buses 20 and 21. Bus 20 is a common ground bus interconnecting the like polarity outputs of each of the uniform seismometers which make up the array. Bus 21 carries the combined signals from seismometer elements 101 and 116 to the first five-position, single-throw switch 22 for the first operational amplifier 40. This same bus 21 carries the same signal to a similar five-position, single-throw switch 26 for the second operational amplifier 41. In a like manner this same bus 21 feeds similar switches for additional operational amplifiers not shown in FIG. 1. Each operational amplifier (40, 41, as well as those not shown) is used in a scaling adder-subtracter circuit. A typical adder-subtracter circuit is shown in the Handbook of Operational Amplifier Applications, Burr-Brown Research Corporation, Tucson, Ariz., 1963, page 60.

In a simple scaling adder-subtracter circuit the operational amplifier inverting and noninverting inputs are utilized to produce an output voltage which is the sum and difference of input voltages applied through input resistor networks. The overall gain for each individual signal is determined by the ratio of the resistance of the feedback resistor and input resistors for each input circuit. For example, considering only operational amplifier 40 in FIG. 1, if all input resistors 51–66 are identical and equal in resistance to the inverting and noninverting feedback resistors 83 and 84, a series of seismometer signals ($E_1$, $E_2$, $E_3$, $E_4$) applied to four of the inverting input resistors 51, 55, 59, 63 and a second series of signals ($E_5$, $E_6$, $E_7$, $E_8$) applied to four of the noninverting input resistors 54, 58, 62, 66, would produce an output voltage, $E_o$, equal to the sum of $E_5$, $E_6$, $E_7$, $E_8$ less $E_1$, $E_2$, $E_3$, and $E_4$, or $E_o = -E_1 - E_2 - E_3 - E_4 + E_5 + E_6 + E_7 + E_8$ Operational amplifier 40 is operating under these conditions at unity gain since all the resistors have the same value. Scaling, or weighting, can be applied to each input signal by varying the values of the feedback resistores (83, 84) and the individual input resistors (51–66). Taking $R_1$, $R_2$, $R_3$ and $R_4$ as the resistance values of the four inverting input resistors 51, 55, 59, 63, $R_5$, $R_6$, $R_7$ and $R_8$ as the resistance values of the four noniverting input resistors 54, 58, 62, 66, and $R_o$ as the value for the inverting and noninverting feedback resistors 83 and 84, then the output voltage, $E_o$, of operational amplifier 40 is given by $E_o = -(R_o/R_1)(E_1) - (R_o/R_2)(E_2) - (R_o/R_3)(E_3) - (R_o/R_4)(E_4) + (R_o/R_5)(E_5) + (R_o/R_6)(E_6) + (R_o/R_7)(E_7) + (R_o/R_8)(E_8).$ Since $R_o$ is common to all terms, the overall gain of a single operational amplifier adder-subtracter circuit may be changed by changing $R_o$, the feedback resistance. On the other hand, the relative gains or weights given the signal input to any individual inverting or noninvering input resistor can be changed by choosing the proper relative value of that particular resistor ot others in the network.

Considering the input resistor network to the operational amplifier 40, as shown in FIG. 1, the input signals from seismometers 101 and 116 may be connected by switch 22 in position 1 or 2 through resistor 51 or 52 to the amplifier's inverting input 6, or in position 4 or 5 through resistor 53 or 54 to the amplifier's noninverting input 7, or entirely disconnected from the amplifier in the middle switch position 3. The switch is so configured that all unused inputs are grounded to maintain proper scaling. The combined signal from seismometers 104 and 113, for example, is fed by bus 30 through switch 23, and resistor 55 or 56 also to the operational amplifier 40 inverting input 6, or alternatively through resistor 57 or 58 to this operational amplifier noninverting input 7. Again, the third position of the switch does not connect the seismometers 104 and 113 to this operational amplifier.

In a similar manner, seismometers 105 and 112 are connected to operational amplifier 40 through bus 31, switch 24, and resistors 59 or 60, 61 or 62, the choice of inverting or noninverting input or no connection again being determined by the switch position. The combined signal from the center two seismometers, 108 and 109, in the 16-element array is fed by bus 32 to switch 25, where again as determined by the switch position the inverting input terminal 6 of operational amplifier 40 is accessed through resistor 63 or 64, the noninverting input terminal 7 of operational amplifier 40 is activated through resistor 65 or 66, or no connection is made to the amplifier when the switch is in the midpoint position. For a 16-channel weighting unit, four additional switches and resistor networks would be required for operational amplifiers 40 and 41.

In a typical application, resistors 52, 53, 56, 57, 60, 61, 64 and 65 would all have essentially identical resistance values as would the center two resistors in the remaining switching networks which are not shown. The outer two resistors, 51, 54, 55, 58, 59, 62, 63 and 66, in the switch networks 22, 23, 24, 25 as shown in FIG. 1, and similarly positioned resistors in the omitted networks, would all have resistances half those of said center resistors 52, 53, 56, 57, 60, 61, 64 and 65.

Feedback is provided for amplifier 40 by resistors 83 and 84 and capacitors 42 and 43. By adjusting the values of the variable feedback resistors 83 and 84 relative to identical input resistors 52, 53, 56, 57, 60, 61, 64, 65, the gain of the operational amplifier 40 may be set to any desired value. For example, suppose a gain of five was desired in amplifier 40. The feedback resistors 83 and 84 would then be adjusted to have five times the resistance of input resistors 52, 53, 56, 57, 60, 61, 64, 65. Therefore, amplifier 40 would have a gain of five when switches 22–25 were in position 2 or 4. Since input resistors 51, 54, 55, 58, 59, 62, 63 and 66 would have one-half the resistance of resistors 52, 53, 56, 57, 60, 61, 64 and 65 amplifier 40 would have a gain of 10 when switches 22–25 were in position 1 or 5. In switch positions 1 and 2 the individual seismometer signals from buses 21, 30, 31, 32 are combined and inverted in amplifier 40. In switch positions 4 and 5 operational amplifiers 40's noninverting input terminal 7 is connected to the individual seismometers and the signals are amplified with their polarity unchanged. Likewise for amplifier 41 signals from buses 21, 30, 31, 32 are combined with either polarity at some other desired gain or at twice this desired gain.

To further illustrate this, assume resistors 52, 53, 56, 57, 60, 61, 64, 65, 83 and 84 are all 10,000 ohms while resistors 51, 54, 55, 58, 59, 62, 63 and 66 are all 5,000 ohms. Let switches 22, 23, 24 and 25 be in the number 1 position. All four input channels are now connected through 5,000 ohm resistors to operational amplifier 40 inverting input 6. Since the values of inverting feedback resistors 83 and 84 are set at 10,000 ohms, the amplifier will operate at a gain of two and the amplifier output will be twice the sum of all the inputs with the polarity reversed. If all switches, 22, 23, 24, 25, are in the second position, the operational amplifier output will be the sum of the input signals with polarity reversed. In the fourth switch position, the amplifier's noninverting input is connected to the respective buses and the operational amplifier output is the sum of the original signals with original polarity. In the fifth switch position the same result is obtained but with twice the gain.

By altering the individual switch position so that switch 22 is in the first position, switch 23 in the second position, switch 24 in the fourth position, and switch 25 in the fifth position, twice the signal from bus 32, seismometers 108 and 109, is added to the signal from bus 31, seismometers 105 and 112, and from this total is subtracted the signal from bus 30, seismometers 104 and 113, and twice the signal from bus 21, seismometers 101 and 116. The overall level of this combined output signal from operational amplifier 40 is determined by the setting of the variable feedback resistors 83 and 84. If these feedback resistor values were doubled, the level of the final output signal would double.

Although these two variable resistors are normally of the same value and simultaneously adjusted, they may be of different values and separately controlled, if desired, to permit different inverting and noninverting amplifier gains.

As shown in FIG. 1, operational amplifier 41 is connected to buses 21, 30, 31 and 32 in a similar manner to that shown for operational amplifier 40. The value of identical resistors 67, 70, 71, 74, 75, 78, 79 and 82 is again hald the value of identical resistors 68, 69, 72, 73, 76, 77, 80 and 81, so that the 2 to 1 plus or minus gain ratios are maintained. Feedback is provided for amplifier 41 by resistors 85 and 86 and capacitors 44 and 45. A second overall gain value is chosen for operational amplifier 41 which differs from that selected for operational amplifier 40. This is accomplished by adjusting the variable feedback resistors 85 and 86 to different values than those of resistors 83 and 84.

In a similar manner, additional weighting amplifiers may be added depending on the sophistication and type of weighting desired. In FIG. 1 a total of five operational amplifiers is implied although only two are shown.

The output of each weighting amplifier circuit (involving amplifiers 40 and 41, as shown, and the three additional operational amplifiers not shown) are then combined in an averaging circuit employing an additional operational amplifier 39. A typical averaging circuit is shown on page 60 of the Handbook of Operational Amplifier Applications, supra. The purpose of this circuit in our invention is to produce an average of the combined inputs from the five individual operational amplifiers, each having different gain settings. We prefer to have the circuit of operational amplifier 39 utilize only one input—for example, the inverting input, 12—while the noninverting input 13 is grounded through drift-stabilizing resistor 93 and capacitor 47. As a consequence, the signals from the preceding weighting amplifiers are inverted, restoring the original seismometer signal polarity for the first two positions on switches 22, 23, 24 and 25. Variable feedback for averaging amplifier 39 is provided by capacitor 46 and resistor 92 which is normally adjusted so that the lowest level signal from the weighting amplifiers is passed to the output terminals, 49 and 50, at unity gain. When this is done and drift-stabilizing resistor 93 is set at approximately one-half this value, the output signal is an average of the five input signals. The gain of amplifier 39 is determined by the ratios of the values of the inverting input feedback resistor 92 and the individual input resistors 87, 88, 89, 90 and 91. By properly choosing the values of the input resistors an averaged output signal can be obtained which will not appreciably vary in level regardless of the gain settings of the particular weighting amplifiers.

Although shown as separate resistors for clarity, variable feedback resistors 83 and 84, 85 and 86, and each pair of remaining feedback resistors not shown can each be combined in a single unit with both controls gauged on a common shaft for each amplifier which will provide the required weights for each element of the seismometer array.

Condenser 48 blocks any DC present in the output and resistor 94 bleeds off any charge that may be retained on condenser 48, preventing damage to the remote amplifying and recording apparatus when the weighting unit is initially connected, as well as providing a means for checking the continuity in the long multiconductor cables connecting the weighting unit output terminals 49 and 50 to the remote amplifying and recording apparatus. Although a number of operational amplifiers may be used in our weighting unit, each is about one-third inch in diameter and one-quarter inch high. The power requirements are so low that the internal batteries 33–38 can supply all the power required for several months operation without recharging or renewal. To minimize the battery drain, variable resistors. 95, 96, 97, are used to adjust each operational amplifier quiescent current to a very low value below 100 microamperes, which provides essentially shelf life for the batteries when the unit is not connected. Typical components for an integer weighting unit constructed according to our invention are given in Table 1.

Table 1

| | |
|---|---|
| Amplifiers 40, 41 | High Performance, General-Purpose Operational Amplifier, Solitron UC 4250 C or equivalent |
| Switches 22, 23, 24, 25, 26, 27, 28, 29 | 5-Position, Single-throw Shorting and Non-Shorting Oak 399056A and 399073F |

Table 1 - Continued

| | |
|---|---|
| Batteries 33, 34, 35, 36, 37, 38 | 12 volt |
| Capacitors 42, 43, 44, 45, 46, 47 | 390 picofarads |
| Capacitor 48 | 330 microfarads |
| Resistors 51, 54, 55, 58, 59, 62, 63, 66, 67, 70, 71, 74, 75, 78, 79, 82 | 5,000 ohms |
| Resistors 52, 53, 56, 57, 60, 61, 64, 65, 68, 69, 72, 73, 76, 77, 80, 81 | 10,000 ohms |
| Resistors 83, 84, 85, 86, 87, 88, 89, 90, 91, 92 | 10,000 ohms |
| Resistors 93, 94 | 5,000 ohms |
| Resistors 95, 96, 97 | 1.58 megohms |

For other types of array weighting, variable feedback resistors 83, 84, 85, 96, and others not shown, would be adjusted to give the relative amplification required for each pair of seismometers in the array. Rather than switches 22, 23, 24, 25, 26, 27, 28, 29, shorting input connector jacks could be used to feed the weighting amplifier input resistor networks.

As apparent to one skilled in the art of constructing and packaging instruments for use in seismic prospecting, our weighting unit can be arranged in a variety of configurations for field use, depending on the type of terrain and climate in the prospect area, as well as the particular equipment and method of operation used by the field crew. Consequently, no single packing arrangement is representative of the wide variety of possible sizes and shapes our apparatus can assume. However, each weighting unit, regardless of how configured, will contain at least $(m)(n)/2$ five-position switches to select the plus or minus unity gain, plus or minus twice unit gain, or zero gain for the m number of seismometers and n weighting amplifiers, which are original design parameters. For example, as seen on FIG. 1, eight seismometers 101, 104, 105, 108, 109, 112, 113, 116 are shown connected, so that m equals 8. Also, only two weighting amplifiers 40, 41 are shown so that n equals 2. Consequently, eight input gain switches 22, 23, 24, 25, 26, 27 and 28 are required. If all 16 seismometer elements were connected and the other three operational amplifiers, implied but not shown connected on FIG. 1, were used, a total of 40 switches would be required. In addition, each weighting amplifier 40, 41, requires two variable feedback resistors 83 and 84, 85 and 86, which are ganged on a single shaft to provide single-knob control. Averaging amplifier 39 also requires a ganged pair of variable resistors 92 and 93, as well as one adjustable input resistor 87, 88, 89, 90 and 91 for each weighting amplifier used in the unit. For the five weighting amplifiers, implied but not shown connected in FIG. 1, this means a total of 11 controls would be required in addition to the 40 switches mentioned above. One male seismometer input terminal 18, 19 must be provided for each seismometer in the array, and a single output cable with a female seismometer output terminal at its far end is used to connect terminals 49 and 50 to the multiconductor cable leading to the remote amplifying and recording apparatus. Even though miniature switches and variable resistors can be used, the overall size of the unit is determined primarily by these elements, since the miniaturized integrated circuit operational amplifiers 39, 40, 41; resistor networks 51–82, 87–91; quiescent current-limiting resistors 95, 96, 97; bypass capacitors 42–47; DC protection capacitor 48, and bleeder resistor 94, are relatively small in size, the remaining space in the field unit is filled with batteries 33–38. One configuration makes use of a lightweight aluminum instrument case, which has been ruggedized and made water-tight for use in severe environments. This case, designed for easy hand-carrying through brush and forests, is but one of a large variety of such cases developed for military applications, and currently available from a number of commercial manufacturers.

Figure 2B:
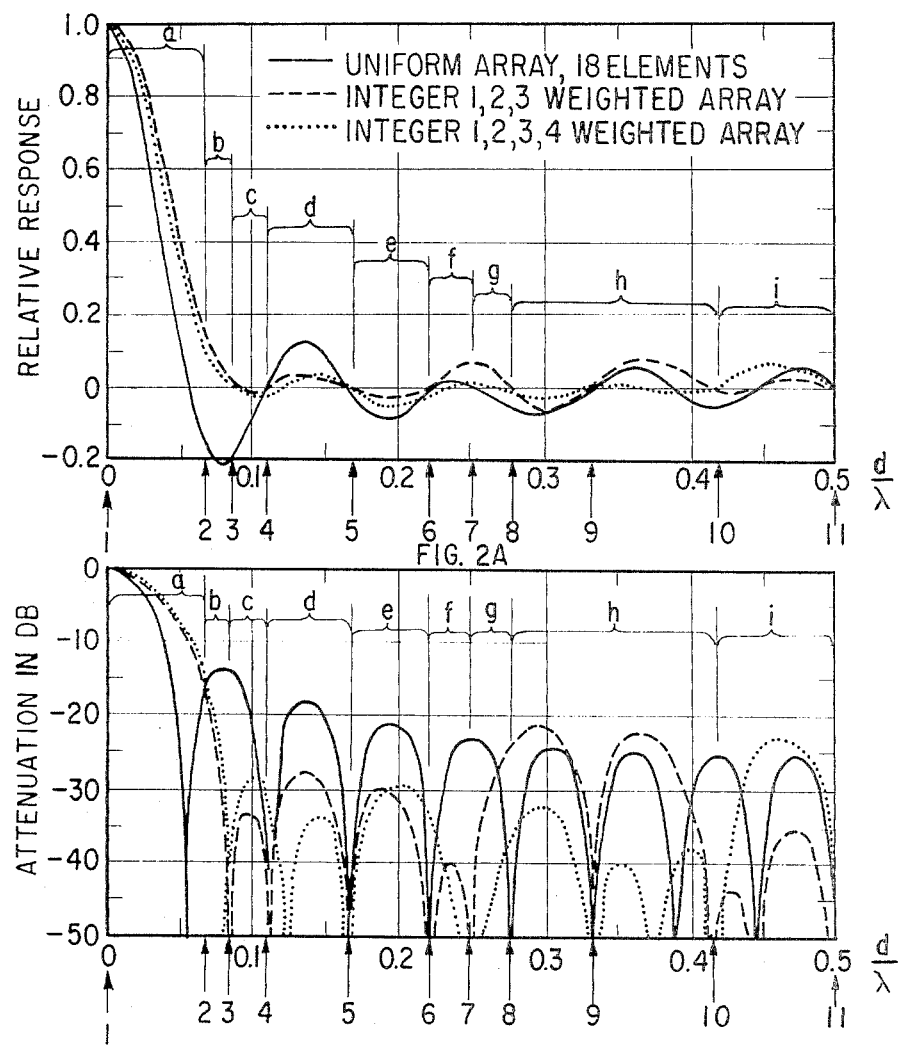

To illustrate the improved array response obtainable with our weighting unit in particular field situations, FIG. 2 shows three different seismometer array response curves from an 18-element linear array. The upper graph shows relative response or normalized signal amplitude of the arrays' outputs as a function of the unitless quantity $d/\lambda$, where $d$ is the distance between adjacent seismometers and $\lambda$ is the apparent wavelength. The lower graph of FIG. 2b presents the same information plotted on a logarithmic scale to show the attenuation in decibels as a function of $d/\lambda$.

The curves shown on each graph compare the array responses obtained with presently used uniform weighting shown by the solid curve to two different integer weighting values obtained by use of our weighting unit, as shown by the dashed and dotted curves. The solid curve is the response of an 18-element uniform array as obtained using current operating methods. The dashed and dotted curved as obtained using only two operational amplifiers 40 and 41, as shown in FIG. 1, but with the addition of two seismometer input connections and one additional bus and associated switch networks for the extra two seismometers.

When operated in the integer mode, weighting amplifier 40 is adjusted by means of feedback resistors 83 and 84 to unity gain and weighting amplifier 41 to five times unity gain by adjusting feedback resistors 85 and 86. When any input channel switch associated with amplifier 40 is in the first position, the gain is doubled or a weight of +2 is produced. In the second position, unity gain or a weight of +1 results. In the third position a gain of zero is produced. In the fourth position, unity gain, but with the polarity reversed or a weight of −1 is produced and in the fifth position a weight of −2 results. In a similar manner, when the switch between the same input channels and weighting amplifier 41 is in the first, second, third, fourth and fifth position, weights or gains of +10, +5, 0, −5 and −10 are produced. By combination of the two switch positions, any desired integer weighting value can be produced between −12 and +12 as seen in Table 2.

Table 2

| Amplifier 40 Switch Position (Weight) | Amplifier 41 Switch Position (Weight) | Resultant Combined Channel Weight |
|---|---|---|
| 3 (0) | 3 (0) | 0 |
| 2 (+1) | 3 (0) | +1 |
| 1 (+2) | 3 (0) | +2 |
| 5 (−2) | 2 (+5) | +3 |
| 4 (−1) | 2 (+5) | +4 |
| 3 (0) | 2 (+5) | +5 |
| 2 (+1) | 2 (+5) | +6 |
| 1 (+2) | 2 (+5) | +7 |
| 5 (−2) | 1 (+10) | +8 |
| 4 (−1) | 1 (+10) | +9 |
| 3 (0) | 1 (+10) | +10 |
| 2 (+1) | 1 (+10) | +11 |
| 1 (+2) | 1 (+10) | +12 |
| 4 (−1) | 3 (0) | −1 |
| 5 (−2) | 3 (0) | −2 |
| 1 (+2) | 4 (−5) | −3 |
| 2 (+1) | 4 (−5) | −4 |
| 3 (0) | 4 (−5) | −5 |
| 4 (−1) | 4 (−5) | −6 |
| 5 (−2) | 4 (−5) | −7 |
| 1 (+2) | 5 (−10) | −8 |
| 2 (+1) | 5 (−10) | −9 |
| 3 (0) | 5 (−10) | −10 |
| 4 (−1) | 5 (−10) | −11 |
| 5 (−2) | 5 (−10) | −12 |

The dashed array response curve shown in FIG. 2 is obtained using only integer weights +1, +2, and +3. All the channel switches (including those not shown in FIG. 1) corresponding to seismometers 101, 102, 103, 116, 117, and 118 are set to unity weight which, as seen from Table 1, means the weighting amplifier 40 switch for each of the first three channels is in the second or unity gain position and the weighting amplifier 41 switch in the third or disconnect position. Channel switches for the next three channels associated with seismometers 104, 105, 106, 113, 114, and 115, and weighting amplifier 40 are set to the first, or twice unity gain position while the switches for the same input channels associated with weighting amplifier 41 remain in the disconnect or third position. Seismometers 107, 108, 109, 110, 111 and 112 are connected to weighting amplifier 40 non-inverting input through resistors connected to the fifth switch position, producing twice unity gain but with the polarity reversed, and to weighting amplifier 41 through the unity gain switch position giving a gain of five times unity. When combined in the weighted averaging circuit of amplifier 39, this produces an overall gain of three times unity. Therefore, while the solid curve represents uniform weighting or seismometer cofficients of 1, 1, 1, 1, 1, 1, 1, 1, 1, 1, 1, 1, 1, 1, 1, 1, 1, 1.

The dashed curve is the array response for positive integer weight 1, 2, and 3, as follows:

1, 1, 1, 2, 2, 2, 3, 3, 3, 3, 3, 3, 2, 2, 2, 1, 1, 1.

The dotted curve is obtained in a similar manner but with the addition of four times unity gain setting obtained by setting the switches associated with weighting amplifier 40 in the reverse polarity unity gain position while leaving the switches connected to the weighting amplifier 41 in the second (or five times unity) gain position, thereby producing an overall gain of four times unity. The individual channel weights for the dotted curve are as follows:

1, 1, 2, 2, 3, 3, 4, 4, 4, 4, 4, 4, 3, 3, 2, 2, 1, 1.

Such simple integer weighting can be very effective at reducing the noise signal levels as larger and larger integer values are used. With only two weighting amplifiers, integer values up to 12 will produce considerably improved array response curves.

When comparing the three response curves shown in FIGS. 2a and 2b, it should be remembered that interfering seismic noise may occur at different positions along the $d/\lambda$ axis and with varying amplitudes depending on local environmental conditions. For example, a noise appearing in region a between points 1 and 2 would be better attenuated by the uniform array (solid curve) than either of the weighted arrays (dashed or dotted curves). In regions b and c the reverse would be true and either of the weighted arrays would do a better job of reducing noise. In region c between points 3 and 4 the array using the integer 3 weights (dashed curve) suppresses noise 4 to 5 db more effectively than the array using the integer 4 maximum weights (dotted curve). Between points 4 and 5 in region d, just the opposite is true. In regions e and f the dashed curve, maximum integer 3 weighting of the array, is to be preferred. Uniform weighting would be preferred over either of the integer weighting methods where a strong noise wave had an apparent wavelength such that its $d/\lambda$ peak was between 0.27 and 0.28 in region g. In region h, the integer 3 weighting (dashed curve) is inferior to uniform weighting while integer 4 weighting (dotted curve) has an approximately 12 db improvement over uniform weighting. In region i, just the opposite is true. Where variable noise conditions are common in the field, it can be seen from FIGS. 2a and 2b the ability to easily change from uniform to integer 3 to integer 4 weighting can produce an improvement in the array response which can result in a 12 to 15 db increase in the signal-to-noise ratio, depending on the apparent wavelength of the interfering noise.

Figure 3A:
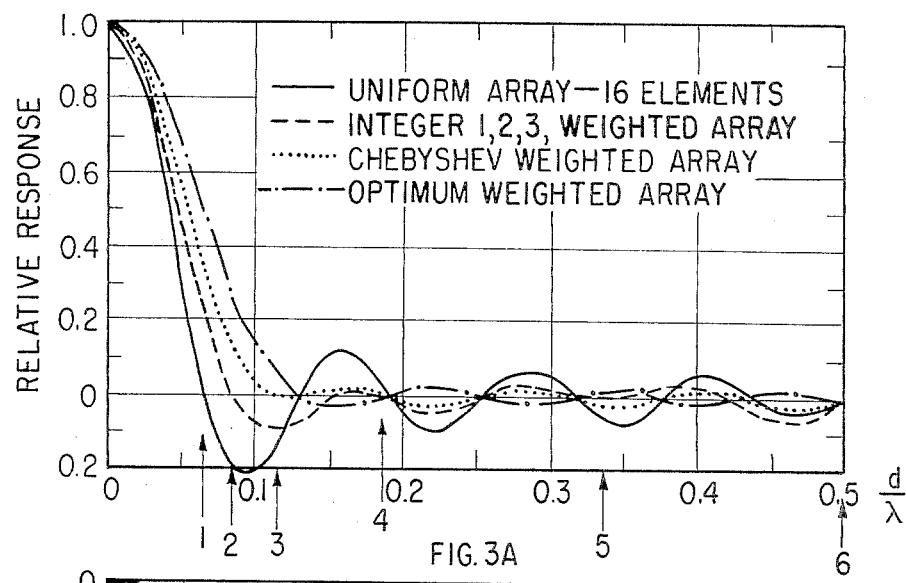
FIGS. 3a and 3b shows the improved spatial filtering attenuation of interfering noise waves which can be obtained with a 16-element, uniformly spaced seismometer array when noninteger element weights are applied using the present invention.

Still further improvements can be obtained if rather than integer weighting some optimized weighting scheme using noninteger values is employed. FIG. 3 illustrates the effect of such noninteger weighting for a 16-element array. The solid curve represents the array response for a uniformly weighted array, while the dashed curve is derived from an integer weighted array using a maximum value of 3. The dotted curve is from a Chebyshev weighted array. The long and short dashed curve is derived from still another type of optimum array weighting. The response curves shown in FIG. 3 were obtained using the relative array weights givem in Table 3.

Table 3.

| Element Numbers | 1 & 16 | 2 & 15 | 3 & 14 | 4 & 13 | 5 & 12 | 6 & 11 | 7 & 10 | 8 & 9 |
|---|---|---|---|---|---|---|---|---|
| Uniform Weighting Coefficients | 1 | 1 | 1 | 1 | 1 | 1 | 1 | 1 |

Table 3.—Continued

| Element Numbers | 1 & 16 | 2 & 15 | 3 & 14 | 4 & 13 | 5 & 12 | 6 & 11 | 7 & 10 | 8 & 9 |
|---|---|---|---|---|---|---|---|---|
| Integer Weighting Coefficients | 1 | 1 | 2 | 2 | 3 | 3 | 3 | 3 |
| Chebyshev Weighting Coefficients | 1.00 | 1.35 | 2.05 | 2.95 | 3.95 | 4.85 | 5.55 | 5.90 |
| Optimum Weighting Coefficients | 1.0 | 8.4 | 13.8 | 40.2 | 59.8 | 77.8 | 91.6 | 99.0 |

Figure 3B:
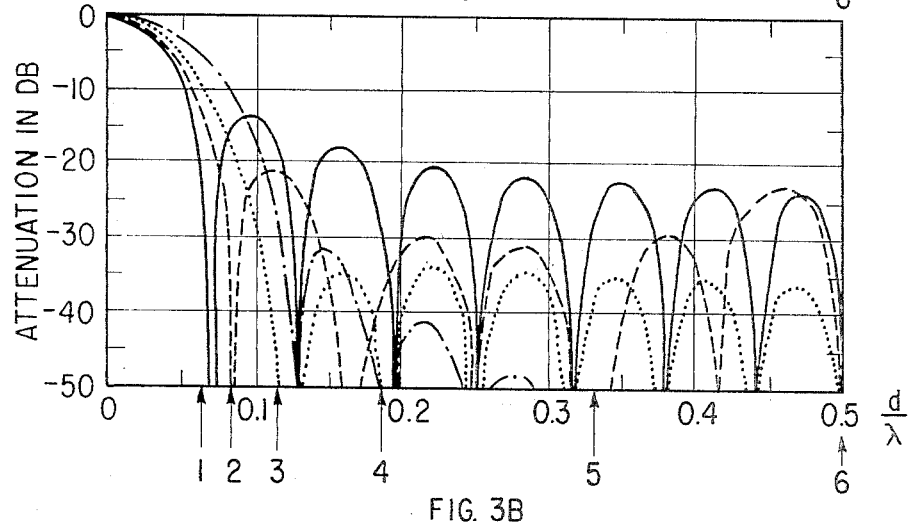

As would be expected from theory, the Chebyshev weighting (dotted curve) gives the best uniform rejection across the band from points 3 to 6 on FIG. 3b. However, if a strong noise signal peaked at 5, the simple integer weighted array (dashed curve) would outperform the one with Chebyshev weighting (dotted curve). The optimum weighted array, whose response is shown by the long and short dashed curve, is far superior for attenuating noises with short apparent wavelengths beyond points 4 to 6 on FIG. 3b. However, it has the poorest cut-off slope of any of the arrays shown. In the area of the array response curve near points 1, 2 and 3 on FIG. 3b, where noise and signal have only slightly different wavelengths, the particular array chosen would depend on the exact interfering noise wavelengths. By using an integer weighted array, thereby sacrificing the improved array rejection of short noise wavelengths, a particularly severe long wavelength noise could be attenuated.

Many weighting procedures for applying weighting to a seismometer array are known in the prior art. What is not known is which of the various weighting techniques best handle a particular noise to be rejected in an individual survey area. Our invention permits very simple experimental determination of the noises to be rejected in the field and then an immediate implementation of an array weighting best suited to attenuate those particular noises.

The noninteger weights are applied using the same weighting amplifiers but with their variable gain controls set to noninteger values. For example, the eight Chebyshev weights shown in Table 3 are obtained using only four weighting amplifiers in combination with the zero, unity, and twice unity gain switches on each individual amplifier. The amplifier gains and switch gains are given in Table 4.

Table 4.

| Weighting Amplifier No. (Basic Amplifier Gain) | Individual Seismometer Channel Switch Position (Switch Amplifier Gain of Amplifier) | | | | | | | |
|---|---|---|---|---|---|---|---|---|
| Amplifier No. 1 (.35) | 3(0.0) | 2(0.35) | 2(0.35) | 2(0.35) | 2(0.35) | 2(0.35) | 2(0.35) | 1(0.70) |
| Amplifier No. 2 (.70) | 3(0.0) | 3(0.0) | 2(0.70) | 2(0.70) | 2(0.70) | 2(0.70) | 1(1.40) | 1(1.40) |
| Amplifier No. 3 (.90) | 3(0.0) | 3(0.0) | 3(0.0) | 2(0.90) | 2(0.90) | 1(1.80) | 1(1.80) | 1(1.80) |
| Amplifier No. 4 (1.00) | 2(1.00) | 2(1.00) | 2(1.00) | 2(1.00) | 1(2.00) | 1(2.00) | 1(2.00) | 1(2.00) |
| Total Weighted Gain (1+2+3+4) | (1.00) | (1.35) | (2.05) | (2.95) | (3.95) | (4.85) (5.55) | (5.90) | |

The still more complicated optimum array weights, the response of which is shown in FIG. 3 by the long and short dashes, require one additional amplifier and are obtained using the basic weighting amplifier gains and switch changes shown in Table 5.

Table 5.

| Weighting Amplifier No. (Basic Gain Setting) | Individual Seismometer Channel Switch Position (Switch Amplifier Gain of Amplifier) | | | | | | | |
|---|---|---|---|---|---|---|---|---|
| Amplifier No. 1 (1.0) | 2(1.0) | 2(1.0) | 2(1.0) | 2(1.0) | 2(1.0) | 2(1.0) | 2(1.0) | 2(1.0) |
| Amplifier No. 2 (7.4) | 3(0.0) | 2(7.4) | 2(7.4) | 2(7.4) | 2(7.4) | 2(7.4) | 2(7.4) | 1(14.8) |
| Amplifier No. 3 (13.8) | 3(0.0) | 3(0.0) | 2(13.8) | 2(13.8) | 2(13.8) | 2(13.8) | 1(27.6) | 1(27.6) |
| Amplifier No. 4 (18.0) | 3(0.0) | 3(0.0) | 3(0.0) | 2(18.0) | 2(18.0) | 1(36.0) | 1(36.0) | 1(36.0) |
| Amplifier No. 5 (19.6) | 3(0.0) | 3(0.0) | 3(0.0) | 3(0.0) | 2(19.6) | 2(19.6) | 2(19.6) | 2(19.6) |
| Total Weighted Gain (1+2+3+ 4+5) | (1.0) | (8.4) | (22.2) | (40.2) | (59.8) | (77.80) | (91.6) | (99.0) |

As seen in Tables 3 and 4, a wide variety of weights can be applied using our basic weighting units. Negative weights which are not shown in the above tables can also be easily implemented when directional discrimination is required.

While the invention has been described in conjunction with the presently preferred embodiment, it should be evident to those skilled in the art that many variations and modifications are possible without departing from its scope. For example, rather than four switch selectable input resistors, six or eight could be used giving weighting amplifier switch controlled gains of ±4 and ±8 in addition to the ±1 and ±2, as shown in our preferred embodiment. It is therefore intended that the invention not be limited to the specific example presented.

We claim:

1. In an improved method of seismic prospecting of the type wherein electrical signals are generated by a plurality of essentially identical individual seismometers positioned adjacent to the surface of the earth, a plurality of group arrays are formed from a selected number of said individual seismometers located adjacent to each other such that a plurality of group array signals are produced by combining said individual seismometer electrical signals, and signals from each said group array are transmitted over a multiconductor cable to a remote multichannel amplifying and recording apparatus where said signals from each group array are individually amplified and recorded, the improvement comprising:
   a. increasing the amplitude of selected individual seismometer electrical signals relative to others in each of said group arrays to maximize the portion of said group array signals resulting from waves arriving from subterranean reflecting interfaces, while minimizing the portion of said group array signals produced by noise waves;
   b. reversing the polarity of said electrical signals from selected individual seismometers when required to maximize the portion of said group array signals resulting from nonvertically arriving waves from subterranean reflecting interfaces; and
   c. combining said increased amplitude and reversed polarity signals from said individual seismometers to form said group array signals such that the amplitude of said combined group array signals at least equals the amplitude of the signal obtained from said group array when no increases in amplitude or reversals in polarity have been applied.

2. A method as recited in claim 1 wherein said amplitude-increasing step is performed by amplifying each of said identical seismometer electrical signals with a plurality of integrated circuit operational amplifiers.

3. A method as recited in claim 2 further comprising:
   a. forming each of said operational amplifiers into a scaling-adder circuit, having a plurality of input terminals and two output terminals, each of said scaling-adder circuits including a plurality of input resistors, an adjustable feedback resistor, an adjustable drift-stabilizing resistor, and two bypass capacitors;
   b. forming said plurality of input resistors into a plurality of switchable input resistor networks such that any one individual seismometer may be connected to one of said input resistors;
   c. connecting each one of said individual seismometers to one each of said switchable input resistor networks;
   d. selecting one of said plurality of input resistors in each of said switchable input resistor networks for each of said individual seismometers;
   e. adjusting the resistance of said feedback resistor to provide the desired amplification for all individual seismometer signals in said operational amplifier by making the ratio of said feedback resistance to said selected input resistance for each individual seismometer equal to the gain desired for that particular individual seismometer signal; and
   f. connecting said output terminals to said multiconductor cable for transmission to said remote amplifying and recording apparatus.

4. A method as recited in claim 1 wherein said polarity reversing step is performed by inverting said electrical signals from a first group of selected individual seismometers relative to said electrical signals from a second group of individual seismometers with a plurality of integrated circuit operational amplifiers in an adder-subtractor circuit.

5. A method as recited in claim 4 further comprising:
   a. forming a plurality of said integrated circuit operational amplifiers each into an adder-subtractor circuit having a plurality of input terminals and two output terminals, each one of said circuits including at least one first input resistor, a first adjustable feedback resistor, at least one second input resistor, a second adjustable feedback resistor, and two bypass capacitors each connected across one of said feedback resistors;
   b. connecting said input terminals from said first input resistors to a first group of said individual seismometers whose electrical signals are to remain with the polarity unchanged;
   c. connecting said input terminals from said second input resistors to a second group of said individual seismometers whose electrical signals are to be inverted;
   d. subtracting said electrical signals from said second group of seismometers from said first group of seismometer electrical signals by combining said signals in said operational amplifier to form said group array signals such that said amplifier output signal is the difference of said electrical signals from said first and said second groups of individual seismometers; and
   e. connecting said output terminals to said multiconductor cable for remote amplification and recording of said group array signal.

6. A method as recited in claim 1 wherein said combining step is accomplished by summing said electrical signals from said individual seismometer with an operational amplifier in an averaging circuit.

7. A method as recited in claim 6 further comprising:
   a. forming an averaging circuit from a plurality of parallel input resistors connected between an inverting input terminal of said operational amplifier and a plurality of input terminals, a feedback resistor connected between an output terminal and said inverting input terminal, a drift-stabilizing resistor connected between a noninverting input terminal of said operational amplifier and ground, a first high-frequency bypass capacitor connected across said feedback resistor, and a second high-frequency bypass capacitor connected across said drift-stabilizing resistor;

b. connecting each of said individual seismometers to only one pair of said input terminals;

c. adjusting the resistance of said input resistors such that each resistor has a value proportional to a predetermined weighting coefficient to be applied to said individual seismometer signals prior to averaging;

d. adjusting the resistance of said feedback resistors such that the lowest of said individual seismometer signals will be amplified with at least unity gain when averaged; and e. connecting said output terminal and ground to said multi-conductor cable for transmitting said group array signal to said remote amplifying and recording apparatus.

8. An improved seismic prospecting system of the type having a plurality of seismometer group arrays, each formed from a plurality of interconnected individual seismometers placed in a pattern adjacent to the surface of the earth, so that the output of said interconnected seismometers becomes the signal of a group array, a remote multichannel amplifying and recording apparatus for separately amplifying and recording the said electrical signals produced by each said group array, and a multi-channel cable for transmitting said group array signals to said remote amplifying and recording apparatus, wherein the improvement comprises:

a. means for selectively increasing the amplitude of said individual seismometer signals prior to combination with other of said individual seismometer signals to form said group array signal for the purpose of improving the discrimination of said group array against seismic noise;

b. means for reversing the polarity of said individual seismometer electrical signals for improvement in group array directivity; and c. means for combining signals from individual seismometers after passing through means (a) and (b) to provide an average thereof as a group array signal prior to transmission of said signal by said multiconductor cable to said remote amplifying and recording apparatus.

9. A seismic system as recited in claim 8 in which said amplitude increasing means comprises:

a. an integrated circuit operational amplifier having an inverting input terminal, a noninverting input terminal, an output terminal, and a ground terminal;

b. a plurality of parallel input resistors, each being connected between only one of said individual seismometers and said inverting input terminal of said operational amplifier, each of said input resistors having a resistance selected to form a predetermined ratio with the resistance of each other input resistor whereby each respective individual seismometer signal will have a predetermined amount of relative amplification prior to interconnecting into said group array.

c. a variable feedback resistor connected between said operational amplifier output and inverting input terminals, said variable feedback resistor resistance being chosen such that each individual seismometer signal is multiplied by a predetermined constant before summing and inversion of the output occurs in said operational amplifier;

d. a first high-frequency bypass capacitor connected across said variable feedback resistor for bypassing undesired high-frequency signals;

e. a drift-stabilizing resistor connected between ground and said noninverting input terminal to stabilize said operational amplifier;

f. a second high-frequency bypass capacitor connected across said drift-stabilizing resistor; and g. means for connecting the output of said operational amplifier to said multiconductor cable.

10. A seismic prospecting system as recited in claim 8 in which said polarity changing means comprises:

a. an integrated circuit operational amplifier having an inverting input terminal, a noninverting input terminal, an output terminal, and a ground terminal;

b. a first plurality of parallel input resistors, each one of said resistors connected between said operational amplifier inverting input terminal and only one of said individual seismometers whose electrical signals are to be inverted;

c. a second plurality of parallel input resistors, each one of said resistors connected between said operational amplifier noninverting input and only one of said individual seismometers whose electrical signals are to remain with their original polarity;

d. a first feedback resistor connected between said operational amplifier output terminal and inverting input terminal;

e. a first high-frequency bypass capacitor connected across said first feedback resistor;

f. a second feedback resistor connected between said operational amplifier ground and noninverting feedback terminals;

g. a second high-frequency bypass capacitor connected across said second feedback resistor; and h. means for connecting the output of said operational amplifier to said multiconductor cable.

11. A seismic prospecting system as recited in claim 8 in which said combining means comprises:

a. an integrated circuit operational amplifier having an inverting input terminal, a noninverting input terminal, an output terminal, and a ground terminal;

b. a plurality of parallel input resistors, each one of said resistors connected between said operational amplifier inverting input terminal and only one of said individual seismometers, each one of said input resistors having a resistance chosen to form a predetermined ratio with each other input resistor;

c. a feedback resistor connected between said operational amplifier output and inverting input terminals, said feedback resistor having a resistance chosen such that in combination with the resistance of said one input resistor used in the lowest level individual seismometer circuit an output signal of at least unity gain is obtained;

d. a first high-frequency bypass capacitor connected across said feedback resistor;

e. a drift-stabilizing resistor connected between said operational amplifier ground and noninverting input terminals, said drift-stabilizing resistor having a resistance of approximately one-half of the value of said feedback resistor;

f. a second high-frequency bypass capacitor connected across said drift-stabilizing resistor; and g. means for connecting said operational amplifier output and ground terminals to said multiconductor cable.

12. An improved seismic prospecting system of the type having a plurality of essentially identical seismometers positioned adjacent to the surface of the earth, electrically connected to form a group array, a remote multichannel amplifying and recording apparatus and a multi-conductor cable, wherein the improvement comprises a small multichannel amplifier apparatus connected between said identical seismometers and said multiconductor cable for the purposes of amplifying a multiplicity of said individual seismometer signals by predetermined values designed to optimize said group array response, said multichannel amplifier including means for inverting as desired the output of selected individual seismometers to permit directing the maximum array response to an off-vertical direction when required, and said multichannel amplifier including means for combining said individual seismometer signals following amplifying and possible inversion to form a single group array signal having a level at least as great as the level attained if said individual seismometers were directly interconnected.

* * * * *